April 3, 1962  E. E. REDA  3,028,586
TEMPERATURE WARNING SYSTEM
Filed July 29, 1959  2 Sheets-Sheet 1
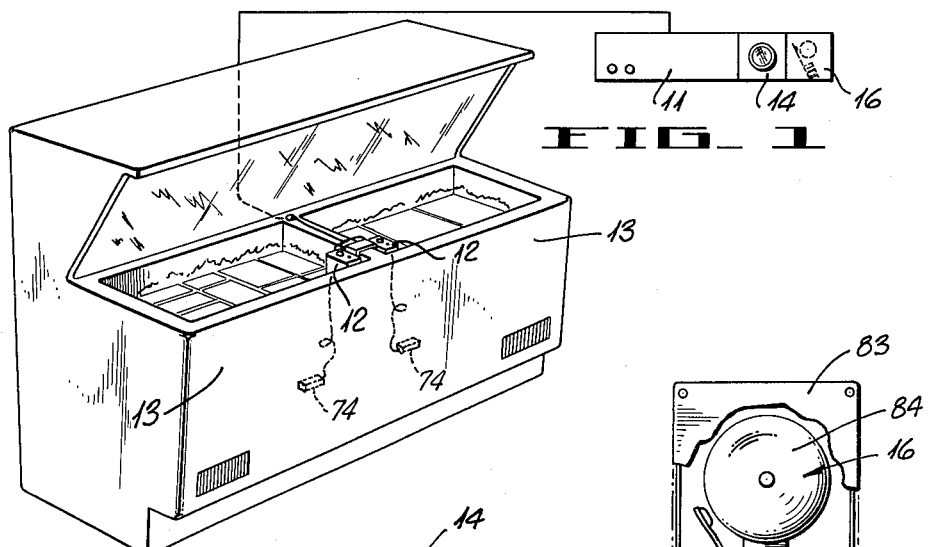
FIG_1
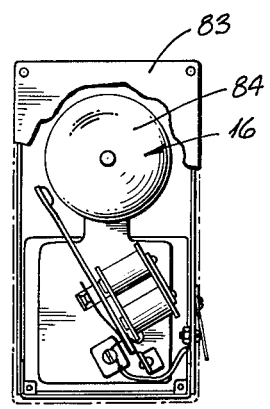
FIG_2
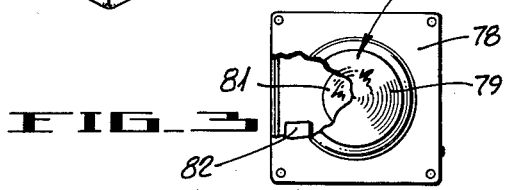
FIG_3
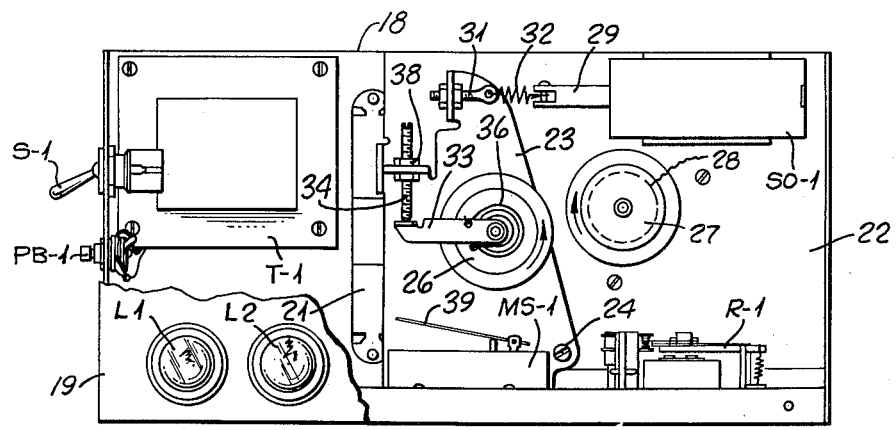
FIG_4
EDWARD E. REDA
INVENTOR.
BY
ATTORNEYS

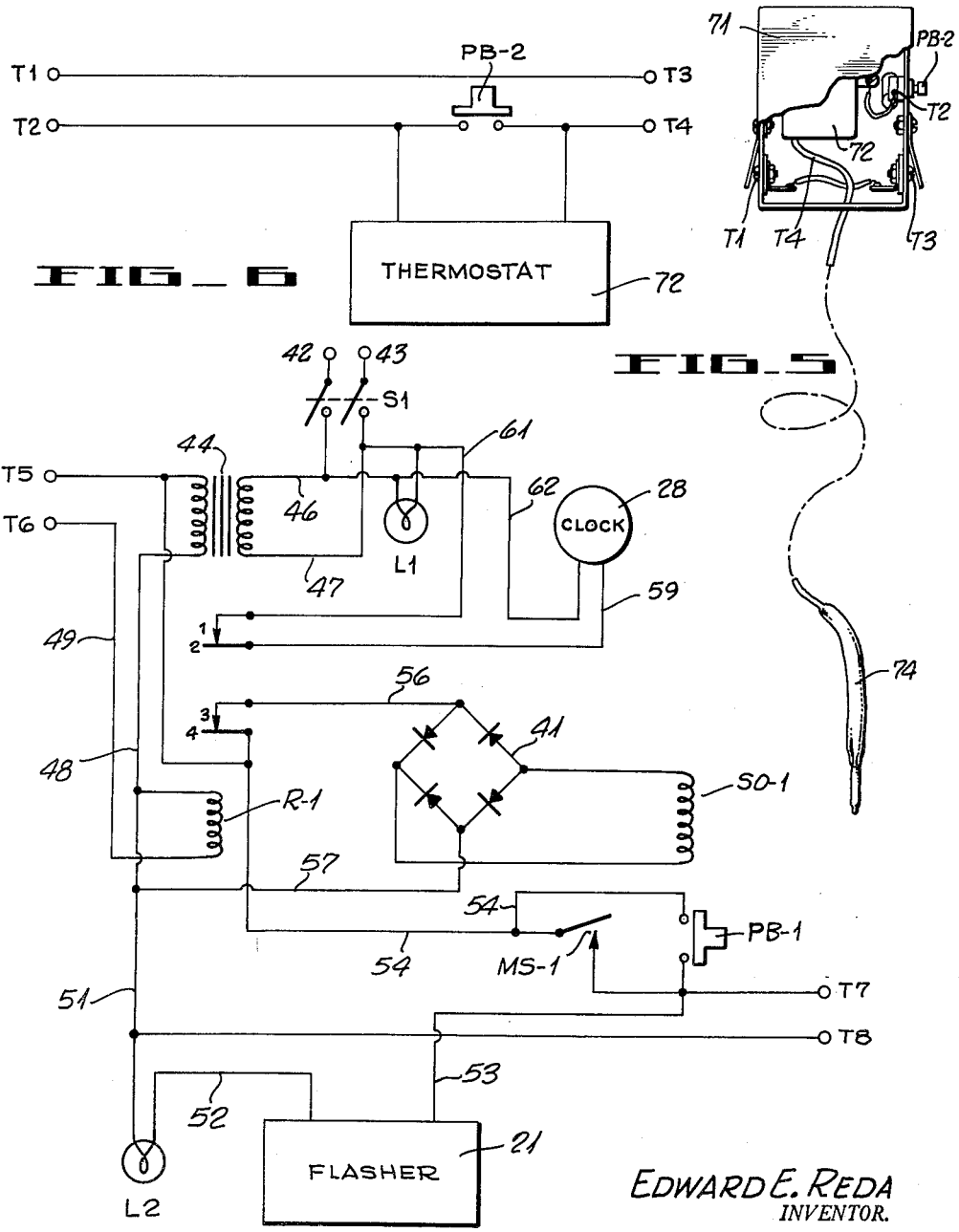

United States Patent Office 3,028,586
Patented Apr. 3, 1962

3,028,586
TEMPERATURE WARNING SYSTEM
Edward E. Reda, 726 Drake St., San Jose, Calif.
Filed July 29, 1959, Ser. No. 830,423
1 Claim. (Cl. 340—227)

This invention relates to a temperature warning system and more particularly to a temperature warning system for giving a warning if an undesirable temperature is maintained for a greater period than a predetermined length of time.

At the present time, large numbers of frozen food cabinets or boxes, dairy and meat lockers are being utilized in supermarkets. Supermarket owners have found considerable difficulty in ascertaining when the refrigeration units for the refrigerated cabinets are operating properly. Normally, the first indication of improper operation of the refrigeration unit of a frozen food cabinet is given when the defrost cycle for the frozen food cabinet has a duration which is greater than the defrost cycle for the frozen food cabinet. When this occurs, the food within the cabinet thaws. There is repeated thawing and refreezing of the food products within the cabinets when the defrost cycle is greater than a predetermined length. There is, therefore, a great need for a device which will give an indication when the time taken for the defrost is greater than the normal time. In other words, there is a need for such a device which will give a signal when the danger temperature within the frozen food cabinet is experienced for a longer time than the normal time required for the defrost operation.

In general, it is an object of the present invention to provide a temperature warning system which gives a warning when an undesirable temperature is reached and maintained for greater than a predetermined length of time.

Another object of the invention is to provide a temperature warning system of the above character in which various types of alarm devices may be utilized.

Another object of the invention is to provide a temperature warning system of the above character in which a plurality of food cabinets can be connected to a single alarm.

Another object of the invention is to provide a temperature warning system of the above character which is fail-safe in its operation.

Another object of the invention is to provide a temperature warning system of the above character which is readily adjustable for different periods of time.

Additional objects and features of the invention will appear from the following description in which the preferred embodiment has been set forth in detail in conjunction with the accompanying drawings.

Referring to the drawings:

FIGURE 1 is a view showing a plurality of frozen food cabinets utilizing a temperature warning system incorporating the present invention.

FIGURE 2 is a view with certain portions broken away of a bell alarm utilized in the system.

FIGURE 3 is a view with certain portions broken away showing an alarm light utilized in the system.

FIGURE 4 is a view of the master or central unit with portions of the front cover broken away utilized in the system.

FIGURE 5 is a view with certain portions broken away of the thermostat assembly utilized in the system.

FIGURE 6 is a circuit diagram with certain portions schematically illustrated of the thermostat.

FIGURE 7 is a circuit diagram of the master or central unit with certain portions schematically illustrated.

In general, my temperature warning system consists of a master or central unit to which a plurality of serially connected thermostats are connected. Timing means is provided in the master or central unit so that a warning signal is given by the master unit when an undesirable temperature is sensed by any one of the thermostats for a period of time greater than the predetermined period of time for which the master unit has been set. The alarm signal from the master unit is utilized for operating conventional alarm devices.

More particularly, my temperature warning system, as shown in FIGURE 1, consists of a master or central unit 11. The master unit 11 is connected to a plurality of normally remotely located thermostat assemblies 12 situated on adjacent frozen food cabinets 13. The master unit 11 is also connected to one or more alarm devices such as the warning light 14 and the warning bell 16 shown in FIGURE 1 of the drawing.

The master unit 11 consists of a case 18 of suitable material such as sheet metal with a removable front cover 19. The master unit 11, as shown in FIGURES 4 and 7, includes a transformer T-1, a toggle switch S-1 and a push button PB-1. The toggle switch S-1 and the push button PB-1 are mounted on one side wall of the case for the master unit as shown in FIGURE 4. The master unit also includes a flasher 21 of conventional construction which is mounted on the rear wall of the case. A solenoid SO-1 is mounted on a partition 22 fixed within the case.

A member 23 is pivotally mounted on the partition 22 at 24 and carries a rotatable rubber tired wheel 26 which is adapted to be moved into engagement with a rubber tired wheel 27 rotatably mounted on the partition 22. The wheel 27 is adapted to be driven by a clock motor 28 mounted on the other side of the partition 22. The wheel 26 is adapted to be movable between a disengaged position and a position engaging the wheel 27 by the solenoid SO-1. The plunger 29 of the solenoid is connected to the upper end of the pivoted member 23 by suitable means such as the eye bolt 31 which is secured to the plunger 29 by a spring 32. A lever arm 33 is affixed to the wheel 26 and normally is retained in engagement with an adjusting screw 34 by a spiral spring 36 mounted on the wheel and secured to the member 23. The adjusting screw 34 is carried by the member 23 and is adapted to have its upper end raised and lowered by threading the same through the nuts 38 mounted on the member 23. The arm 33 is adapted to be moved into engagement with the operating lever 39 of the microswitch MS-1 in a manner hereinafter described.

The master unit also includes a relay R-1 and a full wave rectifier 41.

The master unit is connected to a suitable source of supply such as 115 volts, 60 cycle A.-C. as indicated by the lines 42 and 43. The lines 42 and 43 are connected to the double pole toggle switch S-1 which is connected to the primary of the transformer 44 by conductors 46 and 47. One side of the secondary of the transformer 44 is connected to terminal T-5. The other side of the secondary is connected to one side of the winding for relay R-1 by conductor 48, and the other side of the winding of relay R-1 is connected to the terminal T-6 by conductor 49. Conductor 48 is connected to one side of the lamp L-2 by conductor 51 and the other side of the lamp L-2 is connected to the flasher 21 by conductor 52. The other side of the flasher is connected to one side of the push button PB-1 by conductor 53, and the other side of the push button is connected to movable contact 4 of relay R-1 by conductor 54. Stationary contact 3 of relay R-1 is connected to one side of the input of the rectifier 41 by conductor 56. The other side of the input of the rectifier 41 is connected to the conductor 51 by conductor 57. The output of the rectifier 41 is connected across the solenoid SO-1. Conductor 54 is connected to one side of the switch MS-1. The other side of the switch MS-1 is connected to terminal T-7. The terminal T-8 is connected to the conductor 51. One side of the clock 28 is connected to the movable contact 2 of relay R-1 by conductor 59, and the stationary contact 1 of relay R-1 is connected to the conductor 57 by conductor 61. The other side of the clock 28 is connected to the conductor 46 by conductor 62. The lamp L-1 is connected between conductors 61 and 62.

The thermostat assembly is shown in FIGURE 5 of the drawing and consists of a case 71 in which a push button PB-2 is mounted. A thermostat 72 is mounted within the case and can be of any suitable type. For example, the thermostat can be of a type manufactured by Ranco which is provided with a gas filled temperature sensing element 74 that causes movement of a bellows (not shown) which opens and closes a pair of contacts.

The thermostat assembly also includes terminals T-1, T-2, T-3 and T-4. As is shown in the circuit diagram in FIGURE 6, terminal T-1 is connected to terminal T-3. Terminal T-2 is connected to one side of the thermostat 72 and terminal T-4 is connected to the other side of the thermostat. The push button PB-2 is adapted to cause the thermostat 72 to be bypassed when it is closed or depressed.

The warning light is shown in FIGURE 3 of the drawing and includes a case 78 which is provided with a translucent lens 79. A lamp 81 is mounted within the case in series with a flasher 82 and is adapted to be connected to the master unit as hereinafter described.

The bell-type alarm is shown in FIGURE 2 and also consists of a case 83 in which is mounted a door bell 84 of conventional type.

Operation of my temperature alarm system may now be briefly described as follows. Let it be assumed that it is desired to set up a temperature alarm system in a supermarket which has a plurality of frozen food cabinets. In making such an installation, each of the frozen food cabinets is provided with one of the thermostat assemblies 12. The thermostat assembly 12 may be positioned in any place desired. However, the temperature sensing element 74 must be placed within the frozen food cabinet as shown. A two-wire harness is utilized for connecting the thermostats in series. The serially connected thermostat assemblies are connected by the two-wire harness to the terminals T-5 and T-6 of the master unit 11. The master unit can be positioned at a point relatively remote from the frozen food cabinets. One or more alarm devices such as the light 14 and the bell 16 are connected to the terminals T-7 and T-8 of the master unit.

Now let it be assumed that it is desired to maintain the frozen food cabinets or boxes at 0° F. Also, let it be assumed that the thermostats 72 in each of the thermostat assemblies have been set so that they cut-in, that is, close the circuit at 5° F. and cut-out or open a circuit at 0° F.

Let it also be assumed that the adjusting screw 34 has been positioned so that it will take approximately two hours for the arm 33 to move from its normal resting position to a position in which it actuates the microswitch MS-1. This time is chosen so that it is slightly longer than the period of time normally required for defrost of the cabinet or cabinets.

After all the above operations have been performed, the system may be placed in operation by closing the toggle switch S-1. As soon as the switch S-1 is closed, the lamp L-1 will be lit indicating that the system is in operation. Relay R-1 will also be operated because the contacts in the thermostats are normally closed. Operation of relay R-1 opens its contacts 1 and 2, and 3 and 4.

Now, let it be assumed for some reason or another that the temperature in one of the cabinets or boxes rises to above 5° F., and that one of the thermostats cuts in and opens the circuit. Since the thermostats are in series, relay R-1 will be de-energized closing its contacts 1 and 2, and 3 and 4. Closing of contacts 1 and 2 starts operation of the clock motor 28. Closing of contacts 3 and 4 causes a voltage to be applied to the solenoid SO-1 and causes its operation. Operation of the solenoid SO-1 causes the member 23 to be pivoted in a clockwise direction so that the wheel 26 is moved into engagement with the wheel 27. As long as the temperature in the cabinet remains above 5° F., the thermostat will remain cut-in and for that reason, the clock motor 28 will keep running and the solenoid SO-1 will be energized. The clock motor 28 causes clockwise rotation of the wheel 27 which causes counter-clockwise rotation of the wheel 26. Counter-clockwise rotation of the wheel 26 causes counter-clockwise rotation of the arm 33.

Now let it be assumed that the thermostat which has been cut-in remains cut-in for a period of time which is greater than the period of time for which the master unit has been set. When this occurs, the arm 33 will be moved into engagement with the operating lever 39 of the microswitch MS-1 to cause it to be closed. Closing of the microswitch MS-1 causes the output voltage from the secondary winding of the transformer T-1 to be applied to terminals T-7 and T-8 to cause operation of the alarm devices connected to terminals T-7 and T-8. At the same time, a voltage is applied to the flasher 21 so that the lamp L-2 is periodically flashed as long as the microswitch MS-1 is closed.

As soon as the thermostat again cuts out, a circuit is completed for energizing the relay R-1 which causes opening of its contacts 1 and 2, and 3 and 4. Opening of contacts 1 and 2 de-energizes the clock motor 28, whereas opening of contacts 3 and 4 de-energizes the solenoid SO-1 so that the member 23 drops back to the normal position as shown in FIGURE 4. As soon as the wheel member 26 is out of engagement with the wheel member 27, the spring 36 causes the wheel 26 and the arm 33 carried thereby to be returned to the normal position where the arm is in engagement with the adjusting member 34. The system is now in position for a repeat operation similar to that hereinbefore described.

In normal usage, the master unit is set so that the time required for actuation of the microswitch MS-1 after the solenoid SO-1 has been energized is a period of time which is slightly greater than the period of time normally required for the defrost cycle. Normally, each time the defrost cycle for one of the cabinets or boxes is started, the thermostat associated therewith cuts in to start the operation of the clock motor 28 and energization of the solenoid SO-1. However, when the refrigeration unit for the box or cabinet is operating properly, the defrost cycle for the cabinet or box will be completed before the arm 33 has moved into a position where it can operate the microswitch MS-1. As soon as the thermostat cuts out, the solenoid SO-1 will be energized so that the wheel member 26 will be moved out of engagement with the wheel member 27. Therefore, during the normal defrost cycle, the alarm devices are not normally operated. It is only when the defrost cycle lasts for a period of time which is greater than the period of time normally utilized in the defrost cycle that the microswitch MS-1 is actuated and the alarm devices connected to the master unit energized.

It has been found that this is a very effective way to check the operation of the refrigeration units for the cabinets or boxes. This is because when the refrigeration unit is operating improperly, a period of time greater than the conventional time will be utilized in the defrost cycle. Thus, when the temperature in the box remains above the danger point for longer than the defrost cycle, the alarm devices connected to the master unit are operated.

When the store owner notices that one of the alarm devices is operating, he can quickly determine which cabinet or box is causing the alarm device to be actuated by depressing the push button PB-2 associated with each of the thermostat assemblies. As soon as the push button of the thermostat which has been cut-in is pressed, the alarm devices will stop ringing. This indicates that the box or cabinet associated with this thermostat assembly is operating improperly. The refrigeration unit for the frozen food cabinets can then be checked to ascertain why the defrost cycle is taking longer than should be necessary.

The alarms for the system can be checked at any time by depressing the push button PB-1 which serves to close the circuit around the microswitch MS-1 and apply current to the connected alarm devices.

It is readily apparent that the same apparatus and system can be utilized for other types of boxes, cabinets or the like in which it is desired to maintain a predetermined temperature. For example, in addition to being utilized with frozen food cabinets, the system and apparatus can be utilized with meat lockers, dairy lockers, and the like merely by setting the thermostats for different temperatures. It is also apparent that, if desired, the system and apparatus can be utilized for giving an alarm when a temperature falls below a predetermined level for a period of time greater than a certain predetermined period of time.

The apparatus itself is ready to install and easy to maintain. It is fail-safe in that if the circuit to any one of the thermostats should be broken, the relay R-1 will be de-energized to cause operation of the alarms after a predetermined time interval. Thus, if the system is not operating or is operating improperly, an alarm will be given.

It is apparent from the foregoing that I have provided a temperature warning system which is particularly adapted for supermarkets and the like. Although the system has been described as being interconnected by wires, it is readily apparent that other electrical circuit means can be utilized such as radio.

I claim:

In a temperature warning system, a plurality of serially connected thermostats, each of said thermostats including contact means movable between open and closed positions, said contact means being normally in one position when the thermostat connected thereto is below a predetermined temperature and in said other position when the thermostat connected thereto is above a predetermined temperature, alarm means, relay means connected in series with the contacts of said thermostats, said relay means being operated upon movement of one of said contacts from its normal position, a clock motor, a wheel driven by said clock motor, a separate rotatably mounted wheel, an arm carried by said last named wheel, switch means, said arm being adapted to engage said switch means upon rotation of the same through a predetermined angle by said last named wheel, said solenoid means connected to said relay means and being adapted to move said last named wheel into engagement with said first named wheel upon operation of said relay means, the spacing between said arm and the switch means being such that when the contact means of one of said thermostats is moved from its normal position and remains out of its normal position for a period of time greater than a predetermined length of time said switch means will be actuated to cause operation of said alarm means.

References Cited in the file of this patent

UNITED STATES PATENTS

| | | |
|---|---|---|
| 2,049,413 | Cannon | Aug. 4, 1936 |
| 2,439,331 | Bean | Apr. 6, 1948 |
| 2,509,099 | Jones | May 23, 1950 |
| 2,556,363 | Lord et al. | June 12, 1951 |
| 2,663,860 | MacInnes et al. | Dec. 22, 1953 |
| 2,736,012 | Bland et al. | Feb. 21, 1956 |
| 2,826,044 | Reer | Mar. 11, 1958 |
| 2,893,217 | Nigro | July 7, 1959 |
| 2,913,709 | Thorsen | Nov. 17, 1959 |